(12) United States Patent
Chassard et al.

(10) Patent No.: US 10,193,480 B2
(45) Date of Patent: Jan. 29, 2019

(54) PROPORTIONAL INTEGRAL REGULATING LOOP FOR DIGITAL REGULATOR DEVICE FOR MOTOR VEHICLE EXCITATION ROTARY ELECTRICAL MACHINE

(71) Applicant: VALEO EQUIPEMENTS ELECTRIQUES MOTEUR, Creteil (FR)

(72) Inventors: Pierre Chassard, Creteil (FR); Pierre Tisserand, Limeil Brevannes (FR); Laurent Labiste, Saint Maur des Fossés (FR); Geoffrey Massemin, Lefaux (FR)

(73) Assignee: Valeo Equipements Electriques Moteur, Creteil (FR)

(*) Notice: Subject to any disclaimer, the term of this patent is extended or adjusted under 35 U.S.C. 154(b) by 31 days.

(21) Appl. No.: 15/035,439

(22) PCT Filed: Nov. 17, 2014

(86) PCT No.: PCT/FR2014/052936
§ 371 (c)(1),
(2) Date: May 9, 2016

(87) PCT Pub. No.: WO2015/075363
PCT Pub. Date: May 28, 2015

(65) Prior Publication Data
US 2016/0294313 A1  Oct. 6, 2016

(30) Foreign Application Priority Data
Nov. 19, 2013  (FR) .................... 13 61327

(51) Int. Cl.
*H02P 9/10*  (2006.01)
*H02P 9/30*  (2006.01)
*B60L 1/00*  (2006.01)

(52) U.S. Cl.
CPC .............. *H02P 9/10* (2013.01); *B60L 1/00* (2013.01); *H02P 9/30* (2013.01)

(58) Field of Classification Search
CPC ........... H02P 9/305; Y02T 10/92; H02J 7/245
(Continued)

(56) References Cited

U.S. PATENT DOCUMENTS

| 3,659,907 A | * | 5/1972 | Gunsser ................. B60T 8/172 |
| | | | 180/176 |
| 5,296,798 A | | 3/1994 | Pierret et al. |

(Continued)

FOREIGN PATENT DOCUMENTS

| EP | 0481862 | 4/1992 |
| EP | 0802606 | 10/1997 |
| WO | WO 2011058259 A2 * | 5/2011 ............. H02J 7/245 |

OTHER PUBLICATIONS

Charaabi L et al: II Presentat i on ot an ancient design methodology tor FPGA implementation of control systems application to the design of an antiwindup PI controller, IECON-2002. Proceedings of the 28th. Annual Conference of the IEEE Industrial Electronics Society. Sevilla, Spain, Nov. 5-8, 2002; [Annual Conference of the IEEE Industrial Electronics Society], IEEE, New York,NY, US, vol. 3, 5 Nov. 2002 (Nov. 5, 2002), pp. 1942-1947, XP010633008, DOI: 10.1109/IECON.2002.1185269, ISBN: 978-0-7803-7474-4.
(Continued)

*Primary Examiner* — Julio C Gonzalez
*Assistant Examiner* — Charles Reid, Jr.
(74) *Attorney, Agent, or Firm* — Berenato & White, LLC (57) ABSTRACT

A regulating loop for a digital regulator of an excitation rotating electric machine for operation as a generator delivering an output voltage tailored by an excitation current. The digital regulator comprises a control device for controlling the excitation current and the regulating loop comprises, at
(Continued)

input, a measuring device for measurement by sampling the output voltage generating a measurement signal (Um), an calculation device generating an error signal (e) equal to a difference between the measurement signal (Um) and a setpoint (U0), a processing system for processing of the error signal (e) generating a regulating signal (Ysat) comprising in parallel a first amplifier, an integrator and an anti-saturation system, and comprising, at output, a generation system for generation of a control signal (PWM) controlling the control device as a function of the regulating signal (Ysat). The anti-saturation system is a conditional detection system.

21 Claims, 7 Drawing Sheets (58) Field of Classification Search
    USPC .......................................................... 322/28
    See application file for complete search history.

(56) References Cited

U.S. PATENT DOCUMENTS

| | | | | |
|---|---|---|---|---|
| 5,982,155 | A | | 11/1999 | Rechdan et al. |
| 6,153,945 | A | * | 11/2000 | Koss ...................... H02J 7/245 |
| | | | | 307/10.1 |
| 2003/0007368 | A1 | * | 1/2003 | Kawazoe .............. H02J 3/1885 |
| | | | | 363/34 |
| 2005/0140142 | A1 | * | 6/2005 | Welches .................... H02J 3/30 |
| | | | | 290/41 |
| 2008/0116858 | A1 | * | 5/2008 | Steiner .................... H02J 7/242 |
| | | | | 322/25 |
| 2009/0167256 | A1 | * | 7/2009 | Maddali .................... H02P 9/10 |
| | | | | 322/25 |
| 2009/0250943 | A1 | * | 10/2009 | Larsen ...................... H02P 9/04 |
| | | | | 290/40 B |
| 2010/0053825 | A1 | * | 3/2010 | Tisserand ................ H02J 7/163 |
| | | | | 361/21 |
| 2012/0176100 | A1 | * | 7/2012 | Tisserand .................. H02P 6/14 |
| | | | | 322/24 |
| 2012/0326677 | A1 | * | 12/2012 | Tisserand ................ H02J 7/245 |
| | | | | 322/28 |
| 2017/0133964 | A1 | * | 5/2017 | Tisserand ................ H02P 9/305 |

OTHER PUBLICATIONS

Fanucci L et al: "An high voltage CMOS voltage regulator for automotive alternators with programmable functionalities and full reverse polarity capability", 2010 Design, Automation & Test in Europe Conference & Exhibition : Date 2010; Dresden, Germany, Mar. 8-12, 2010, IEEE, Piscataway, NJ, US, Mar. 8, 2010(Mar. 8, 2010), pp. 526-531, XP032318002, DOI: 10.1109/DATE.2010.5457150, ISBN: 978-1-4244-7054-9.

* cited by examiner

PROPORTIONAL INTEGRAL REGULATING LOOP FOR DIGITAL REGULATOR DEVICE FOR MOTOR VEHICLE EXCITATION ROTARY ELECTRICAL MACHINE

CROSS-REFERENCE TO RELATED APPLICATIONS AND CLAIM TO PRIORITY

This application is a national stage application of International Application No. PCT/FR2014/052936 filed Nov. 17, 2014, which claims priority to French Patent Application No. 1361327 filed Nov. 19, 2013, the disclosures of which are incorporated herein by reference and to which priority is claimed.

FIELD OF THE INVENTION

The present invention relates to a proportional integral regulating loop for a digital regulator device for a motor vehicle excitation rotary electrical machine.

BACKGROUND OF THE INVENTION

In a known manner, an excitation rotary electrical machine, unlike an electrical machine with permanent magnets, can produce engine torque, or supply electrical energy, only when an excitation current is passing through its inductor.

A common type of excitation rotary electrical machine, which is very commonly used in the motor vehicle industry for alternator and starter functions, comprises a rotary inductor and a stator with a plurality of windings.

When the machine is functioning as an alternator, the current which is generated in the windings of the stator by the rotating inductor is rectified such as to supply direct current to the battery of the vehicle.

This voltage depends on the speed of rotation of the inductor, the load connected, and the excitation current.

For motor vehicle applications, the output voltage must be regulated such as to remain constant irrespective of the speed of rotation of the alternator and the charge of the battery.

For this purpose, the output voltage is measured and compared with a set point value by a regulator device which controls the excitation current, such as to minimise any difference.

The company VALEO EQUIPEMENTS ELECTRIQUES MOTEUR has already proposed to carry out this regulation on the basis of sampling measurements by means of digital techniques, which provide substantial advantages in comparison with the conventional analogue methods, in particular in its European patents EP 0 481 862 and EP 0 802 606.

In the design of a modern regulator device, the subjection of the output voltage to a set value is based on the theorisation of a proportional (P) or proportional integral (PI) regulating loop.

The corresponding algorithms adapted to the specifications of the motor vehicle manufacturers can be implemented for example in an FPGA (acronym for Field Programmable Gate Array) associated with an ASIC (acronym for Application Specific Integrated Circuit) which controls the analogue interface with the alternator which has characteristics specific to the component manufacturer, as shown in the article "An High-Voltage CMOS Voltage Regulator for Automotive Alternators with Programmable Functionalities and Full Reverse Polarity Capacity", P. Chassard, L. Labiste, P. Tisserand et al, Design, Automation & Test in Europe Conference & Exhibition (DATE), 2010, EDDA.

The use of a FPGA makes it possible to implement in particular improvements to the conventional PI regulating loops, such as anti-saturation systems, an example of which is given in the article "Presentation of an Efficient Design Methodology for FPGA, Implementation of Control Systems. Application to the Design of Antiwindup PI Controller", L. Chaarabi, E. Monmasson, I. Slama-Belkhodja, 28th annual conference of the IECON, 2002, IEEE.

The authors of this last article show that they obtain a response to a scale without overshoot, but do not give any indication as to the return delay in comparison with an open loop.

However, in the field of application to regulator devices for motor vehicle alternators, the inventive body has identified a need for a regulating loop which makes it possible to obtain a return time during a transition from an open loop mode to a linear regulation mode which is short as possible, i.e. to obtain an expected regulated voltage level as quickly as possible.

SUMMARY OF THE INVENTION

The aim of the present invention is to fulfil this need, and its subject is specifically a proportional integral regulating loop for a digital regulator device for a motor vehicle excitation rotary electrical machine.

This machine is of the type which can function as a generator which provides an output voltage adjusted by an excitation current.

The digital regulator device comprises means for controlling the excitation current and the regulating loop which comprises:

at the input, means for measurement by sampling of the output voltage generating a measurement signal;

error calculation means generating an error signal equal to the difference between the measurement signal and a set point;

means for processing of this error signal generating a regulating signal comprising in parallel a first amplifier, an integrator and an anti-saturation system;

at the output, means for generation of a control signal controlling the control means according to the regulating signal.

According to the invention, the anti-saturation system of the regulating loop has conditional detection.

Advantage is derived from the fact that this anti-saturation system comprises a saturation detector generating a disconnection signal controlling a switch which disconnects the integrator of the error calculation means in the case of detection of a state of saturation of the regulating signal.

Advantageously, the integrator is a pure digital integrator, which preferably has a first transfer function with the form:

$$FT0(z) = \frac{a}{1 - Z^{-1}}$$

Alternatively, highly advantageously, the integrator is a low-pass digital filter, which preferably has a second transfer function with the form:

$$FT1(z) = \frac{b}{1 - (1-b) \cdot Z^{-1}}$$

A cut-off frequency of this digital filter is contained substantially in a frequency band ranging from 10 mHz to 1 Hz.

According to another characteristic, the regulating loop according to the invention additionally comprises a second amplifier in series with the integrator.

Advantage is derived from the fact that an integrator gain of this second amplifier has a predetermined value such as to reduce a static error, whilst guaranteeing stability of the digital regulator device.

According to yet another characteristic, in the regulating loop according to the invention, the switch which disconnects the integrator is additionally controlled by a progressive load response control signal.

These few essential specifications will have made apparent to persons skilled in the art the advantages provided by the invention in comparison with the prior art.

The detailed specifications of the invention are provided in the description which follows in association with the appended drawings. It should be noted that these drawings serve the purpose simply of illustrating the text of the description, and do not constitute in any way a limitation of the scope of the invention.

DETAILED DESCRIPTION OF THE PREFERRED EMBODIMENT(S)

Figure 1:
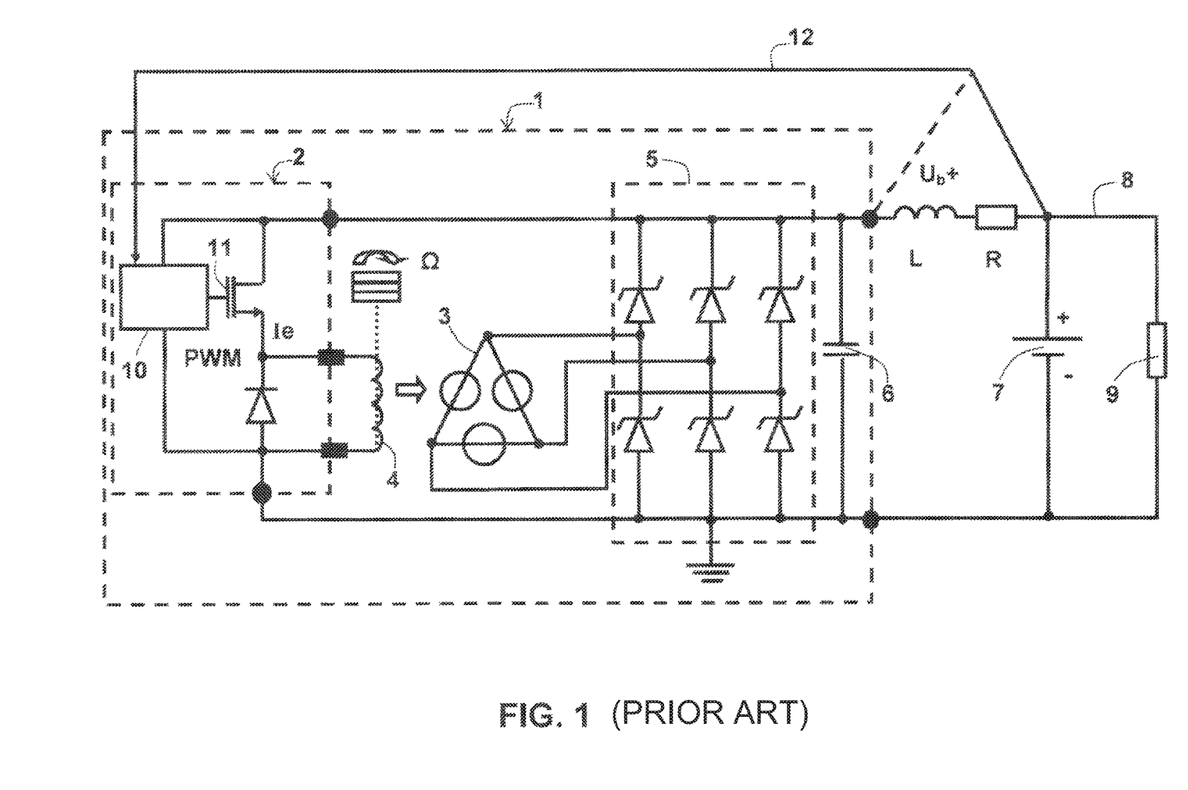
FIG. 1 is a schematic representation of an excitation rotary electrical machine known in the prior art, provided with a digital regulator device comprising a regulating loop, and its use on the on-board network of a motor vehicle.

The excitation rotary electrical machine represented schematically in FIG. 1 is, by way of non-limiting example, a three-phase alternator 1 provided with a digital regulator device 2.

The stator 3 of the alternator 1 comprises three windings which are subjected to the rotary field created by the inductor 4 through which an excitation current $I_e$ passes.

The alternating current produced in the stator 3 is rectified by a rectifier block 5 and filtered by a capacitor 6, such that the alternator 1 supplies a direct output voltage $U_{b+}$ to the battery 7 and to the on-board network of the vehicle 8 supplying a load 9 (a wired power connection being schematised by an induction coil L and a resistor R).

The output voltage $U_{b+}$ of the alternator 1 is kept constant by means of a regulating loop 10, when the load 9 and the speed of rotation $\Omega$ vary, by acting on a control device 11 of the excitation current $I_e$ by sampling of this output voltage $U_{b+}$.

The control device 11 of the excitation current $I_e$ are generally constituted by power transistors 11, functioning with switching and controlled by a PWM variable duty cycle rectangular signal.

Figure 2:
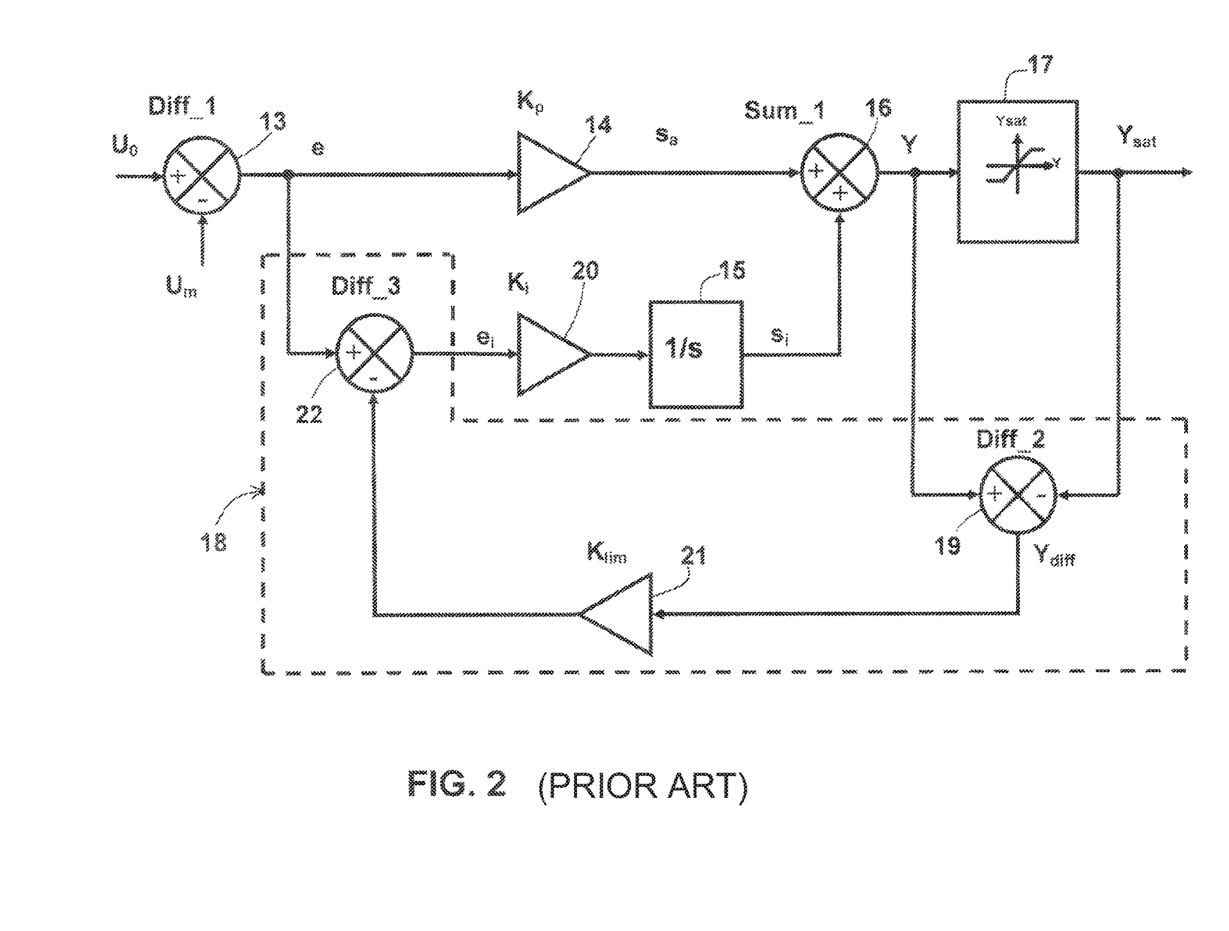
FIG. 2 is a block diagram of a regulating loop of the digital regulator device shown in FIG. 1, of a proportional integral type known in the prior art, and comprising an anti-saturator circuit.

In the most recent alternators 1 known in the prior art, the regulating loop 10 is mostly a proportional or proportional integral regulating loop equipped with an anti-saturation system with calculated feedback of the type shown in FIG. 2.

The regulating loop 10 comprises at an input measuring device which are generally constituted by an analogue-digital converter in order to sample the output voltage $U_{b+}$ of the alternator 1, and generate a measurement signal $U_m$ which is compared with a set point $U_o$.

An error calculation system 13 generates with a first operator "Diff_1" an error signal e equal to the difference between the measurement signal $U_m$ and the set point $U_0$.

In the parallel structure represented in FIG. 2, the error signal e is amplified by a first amplifier 14 with a predetermined proportional gain $K_p$, and is integrated by an integrator 15.

An output voltage $S_a$ of the first amplifier 14 and an output voltage $S_i$ of the integrator 15 are added to an adder block 16 in order to produce an intermediate regulating signal Y.

A saturation block 17 makes it possible to adapt the format of the data of the regulating loop 10 to that of a generation device for generation of the PMW control signal at the output, by supplying a regulating signal $Y_{sat}$ from the intermediate regulating signal Y.

This regulating loop of a known type additionally comprises an anti-saturation system 18 with calculated feedback, the functioning of which is as follows:

Non-Saturated Mode.

A value $Y_{diff}$ represents a difference between an error production before saturation Y and after saturation $Y_{sat}$ carried out by a second operator "Diff_2" 19.

When the loop is non-saturated, the value $Y_{diff}$ is zero, and does not disrupt the functioning of the proportional integral loop 10 (with an integrator gain $K_i$ of a second amplifier 20 in series with the integrator 15 having a first transfer function with the form FT=1/s). The anti-saturation system 18 is considered to be disconnected.

Mathematically:

$$IF(Y=Y_{sat}) THEN\ e_i=e,$$

where $e_i$ is an intermediate error signal at the input of the second amplifier 20 preceding the integrator 15.

Saturated Mode:

The value $Y_{diff}$ is non zero in saturated mode.

The value $Y_{diff}$ in saturated mode attenuates more or less substantially (according to a saturator gain $K_{lim}$ of an additional amplifier 21) the output voltage $s_i$ generated by the integral part 15, 20, via a difference created by a third operator "Diff_3" 22.

Mathematically:

$$IF(Y \neq Y_{sat}) THEN\ e_i=e-K_{lim}(Y-Y_{sat}).$$

It should be noted that the structure of the "anti-saturation system with calculated feedback" type 18 comprises two difference operators ("Diff_2" 19 and "Diff_3" 22) and the saturator gain $K_{lim}$, applied to a pure integrator 15.

The problem encountered in this type of known circuit according to the prior art is to obtain a return time during the transition from the saturated mode towards the non-saturated mode which is as high-performance as possible for an application with an alternator regulator.

A proportional integral regulating loop 10 according to the invention, which, unlike the regulating loops known in the prior art, comprises an anti-saturation system 23 with conditional detection, makes it possible to optimise the return time to the non-saturated mode.

Figure 3:
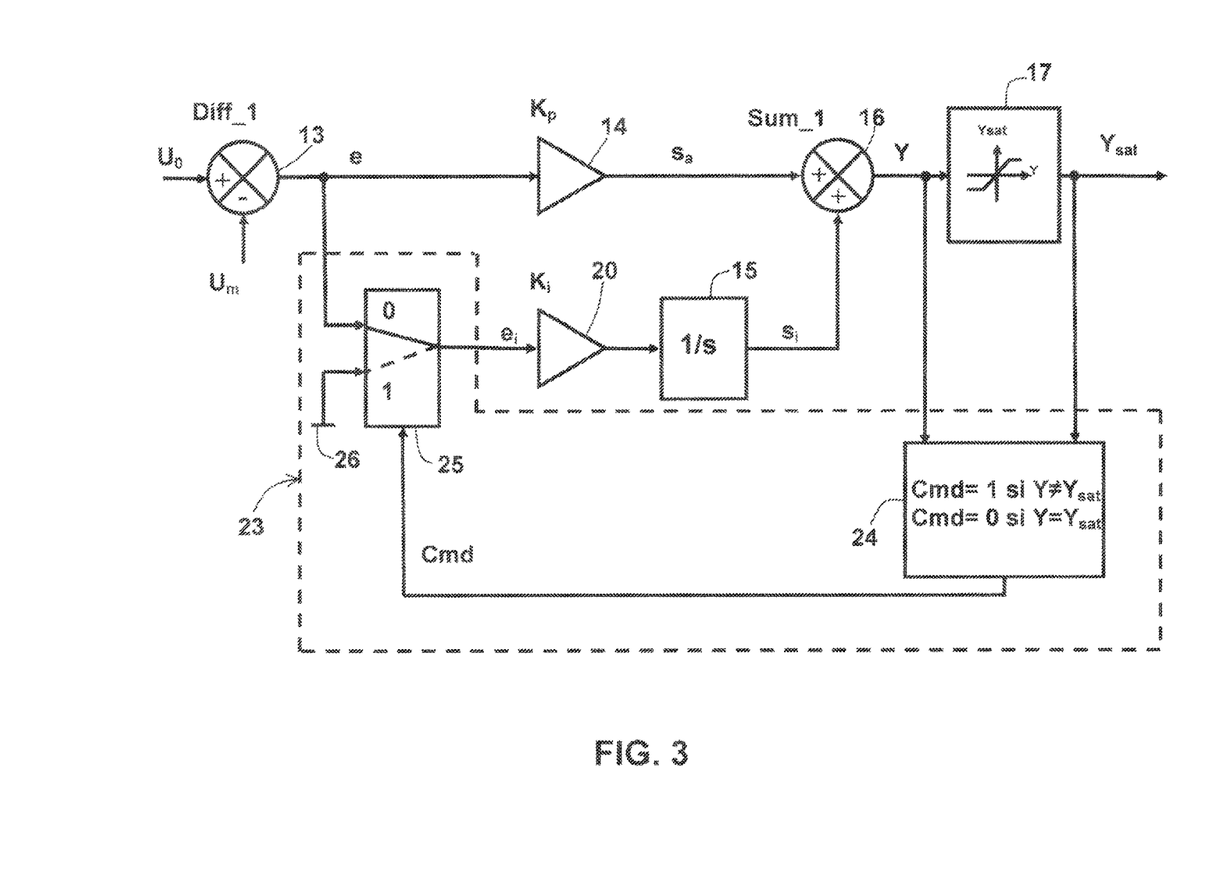
FIG. 3 is a block diagram of a proportional integral regulating loop in a first preferred embodiment of the invention.

A block diagram of the regulating loop 10 in a first preferred embodiment of the invention is shown in FIG. 3.

According to the invention, the integral part 15, 20 of the regulating loop 10 comprising the second amplifier 20 and the integrator 15 is connected or disconnected by the anti-saturation system 23 according to the state of saturation of the regulating signal $Y_{sat}$.

For this purpose, the anti-saturation system 23 comprises a saturation detector 24 which generates a disconnection signal Cmd controlling a switch 25 which applies to the input of the second amplifier 20 either the error signal e, or a voltage with a predetermined value such as the value zero, which zero value is set in FIG. 3 by earthing 26.

The functioning of this anti-saturation system 23 in the proportional integral regulating loop 10 according to the invention is as follows:

Non-Saturated Mode:

When the disconnection signal Cmd is in a zero logic state, the non-saturated mode is detected. The switch 25 connects the error signal e to the input of the integral part 15, 20 (i.e. with the integrator gain $K_i$ of the second amplifier 20 in series with the integrator 15 having a transfer function FT=1/s).

The anti-saturation system 23 is considered to be disconnected.

Mathematically:

IF($Y=Y_{sat}$)THEN $Cmd=0$ and $e_i=e$ where $e_i$ is the intermediate error signal at the input of the second amplifier 20 preceding the integrator 15.

Saturated Mode

When the control signal Cmd is in the logic state 1, the saturated mode is detected. The switch 25 then connects the input of the integral part 15, 20 to a zero voltage in order to stop the output voltage $s_i$ development of the integral part 15, 20.

Mathematically:

IF($Y \neq Y_{sat}$)THEN $Cmd=1$ and $e_i=0$.

The output voltage $s_i$ of the integral part 15, 20 can remain fixed at a constant value during the saturated mode, depending on the embodiment.

In fact, the pure integration operator (FT=1/s, Laplace writing) carries out an operation relative to the non-limited time [0,+∞[defined by the mathematical function:

$$s_i = K_i \cdot \int_0^{+\infty} (e_i) \cdot dt$$

Consequently, $s_i$ is equal to the value of $s_i$ at the moment of the passage into saturated mode.

Figure 4:
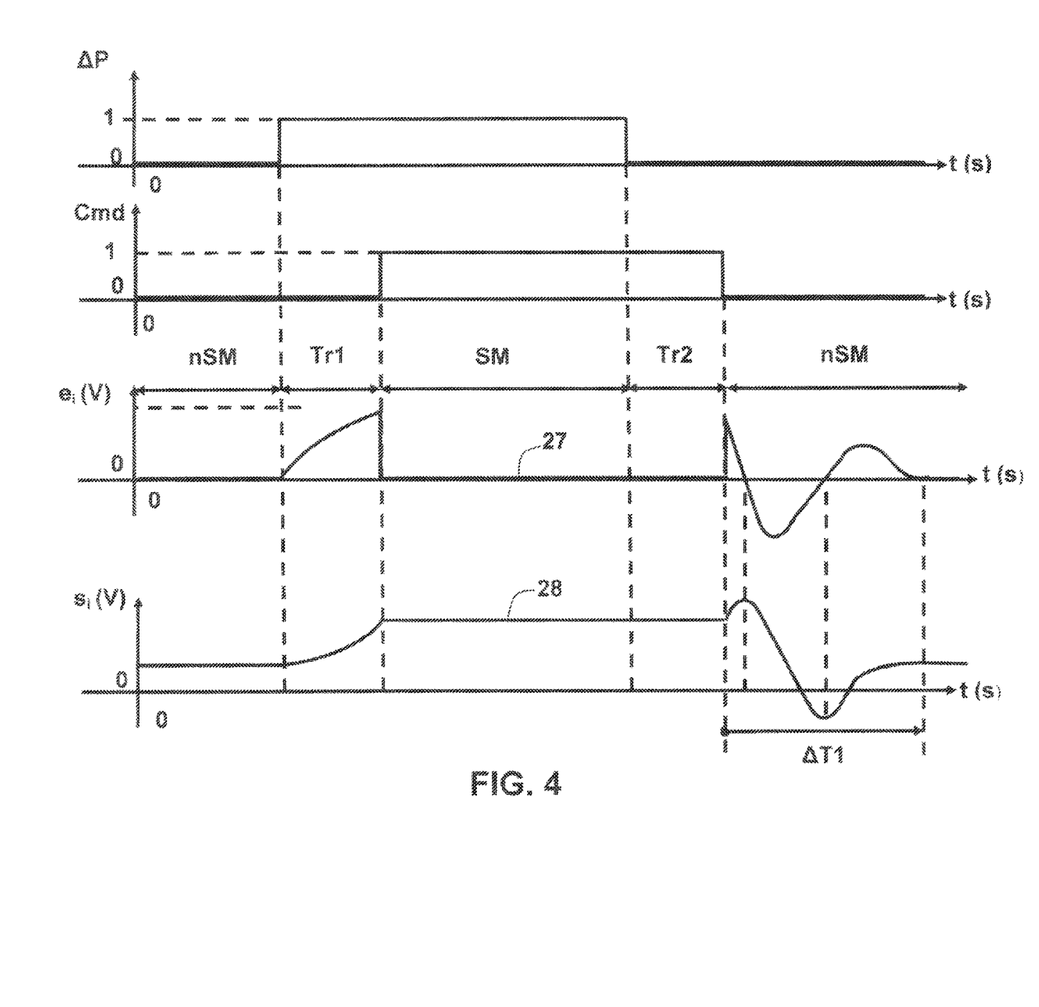
FIG. 4 is a set of timing diagrams showing a first response to a step of the regulating loop shown in FIG. 3.

The timing diagram corresponding to FIG. 4 shows clearly the development of the output voltage $s_i$ of the integrator 15 of this regulating loop 10 during a variation of load ΔP (from the non-saturated mode nSM to a saturated mode SM, but also from the saturated mode SM to a non-saturated mode nSM).

After a first transient state Tr1 derived from the delay between the variation of load ΔP and its detection by the saturation detector 24, the intermediate error signal $e_i$ at the input of the second amplifier 20 preceding the integrator 15 is forced to a zero value 27 as a result of the control of the switch 25 by the disconnection signal Cmd.

Throughout the duration of the saturated mode SM, the output voltage $s_i$ of the integrator 15 is thus represented by a voltage value 28 in FIG. 4.

After a second transient state Tr2 derived from the delay between the end of the variation of load ΔP and its detection by the saturation detector 24, the intermediate error signal $e_i$ at the input of the second amplifier 20 preceding the integrator 15 is equal to the error signal e as the result of the control of the switch 25 by the disconnection signal Cmd.

The anti-saturation system 23 with conditional detection makes it possible to obtain a first return time ΔT1 to non-saturated mode which is close to the optimum.

However, as previously stated, the problem encountered in this type of circuit is to obtain a return time during the transient Tr2 from the saturated mode SM to the non-saturated mode nSM which is as high-performance as possible in relation to the application.

Figure 5:
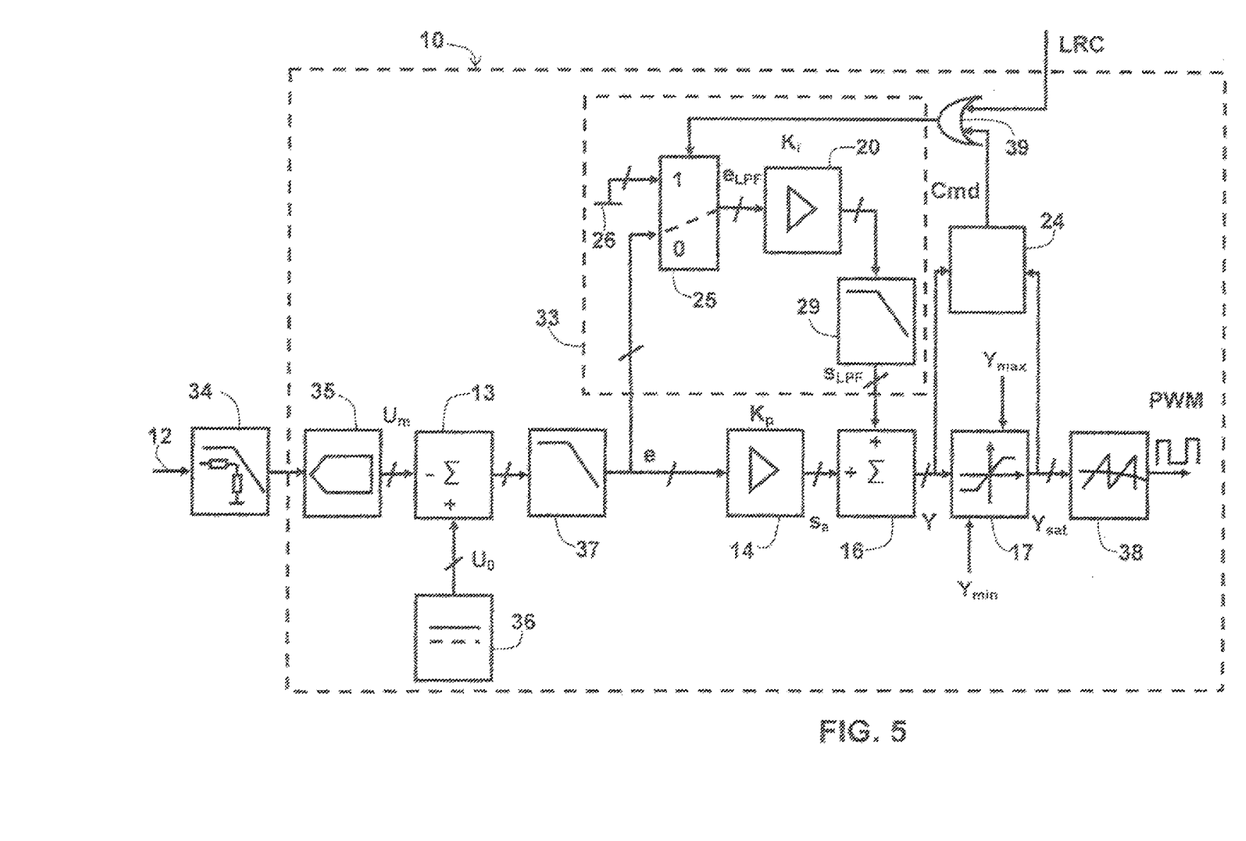
FIG. 5 is a detailed block diagram of a proportional integral regulating loop in a second preferred embodiment of the invention.

In a second preferred embodiment of the invention, the detailed block diagram of which is given in FIG. 5, for this purpose the inventive body has replaced the pure integrator 15 of the first embodiment by a low-pass filter 29.

In other words, the pure integrator 15 with a first transfer function with the form FT=1/s is replaced by a filter 29 with a second transfer function with the form FT=1/(1+τs) (s being the Laplace mathematical variable, and τ being the time constant of the filter).

The low-pass filter 29 is preferably digital, of the second transfer function with the form (transformed into z):

$$FT1(z) = \frac{b}{1-(1-b) \cdot Z^{-1}}$$

Figure 6:
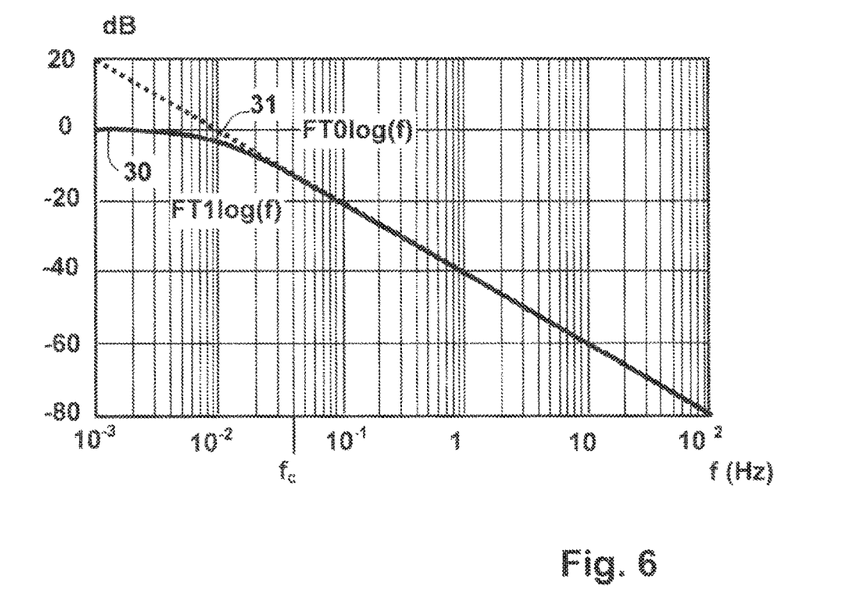
FIG. 6 is a frequency response curve of a low-pass digital filter implemented in the regulating loop shown in FIG. 5.

FIG. 6 shows the frequency response of this filter 29 relative to a pure digital integrator 15 with a first transfer function with the form:

$$FT0(z) = \frac{a}{1-Z^{-1}}$$

The line on the Bode's plan is produced by the transformation $$Z(f) = e^{j2\pi\frac{f}{fe}}.$$

The parameters selected are:

$$a = \frac{1}{2^{20}}$$

with a sampling frequency fe, for example 64 kHz for the first transfer function of the pure integrator 15;

$$b = \frac{1}{2^{20}}$$

with a sampling frequency fe=64 kHz for the second transfer function of the low-pass filter 29.

Preferably, the frequency fe is selected to be greater than the PWM (Pulse Width Modulation) control frequency of the excitation current of the alternator, and far greater than the ripple frequency of the direct voltage at the output of the alternator.

It is observed that, beyond the cut-off frequency, for example $f_c$=30 mHz, the behaviour of the low-pass filter 29 (curve in a solid line 30) and that of the pure integrator 15 (curve in a broken line 31) are identical.

The low-frequency gain is fixed by the integrator gain $K_i$ with a predetermined value of the second amplifier 20 situated in front of the low-pass filter 29, in order to increase the gain of the loop so as to reduce the static error.

Figure 8:
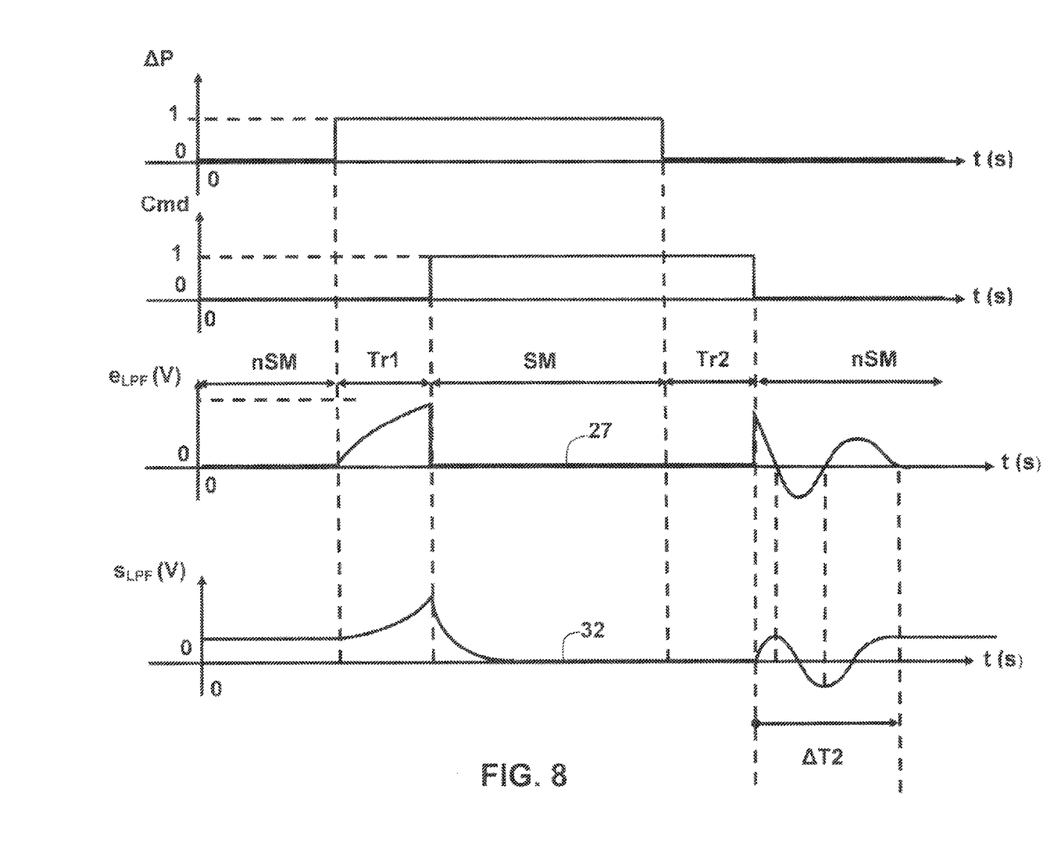
FIG. 8 is a set of timing diagrams showing a second response to a step of the regulating loop shown in FIG. 5.

As shown clearly by the timing diagrams in FIG. 8, corresponding to the second preferred embodiment of the invention, the implementation of this low-pass filter 29 makes it possible to reduce the output voltage value $s_{LPF}$ of the low-pass filter 29 during the saturated mode SM to a zero value 32, and to obtain a regulating loop of type P (proportional only) in saturated mode SM.

In fact, by applying a zero voltage 27 to the input $e_{LPF}$ of the low-pass filter 29 during the saturated mode SM, the value of the output voltage $s_{LPF}$ of the low-pass filter 29 decreases exponentially according to an equation of the type:

$$s_{LPF}(t) = e^{-t/\tau}$$

where:

$s_{LPF}$: voltage of the low-pass output filter 29
t: time variable
$\tau$: time constant of the filter.

As shown by the timing diagrams in FIG. 8, a regulating loop of type P has the advantage of having good reactivity during the transients from the saturated mode SM to the non-saturated mode nSM.

By associating the implementation of a low-pass filter 29 for the creation of the integral part 20, 29 of the regulating loop 10 with the conditional detection of the saturation, a second return time ΔT2 from the saturated mode SM to the unsaturated mode nSM is extremely short for applications which are equipped with an alternator 1 with a battery 7, compared with a return time of an anti-saturation system 18 with calculated feedback known in the prior art (FIG. 2), but also compared with the first very short return time ΔT1 of the anti-saturation system 23 with conditional detection equipped with a pure integrator 15 (FIG. 3).

The connection via the switch 25, controlled by the saturation detector 24 of the low-pass filter 29 with a very low cut-off frequency $f_c$, in the integral part 20, 29 of the regulating loop 10, makes it possible to obtain behaviour very close to that of a pure integrator 15 during the regulation in non-saturated mode nSM.

The advantage of this low-pass filter 29 is to be able to control simply the output level $s_{LPF}$ of the filter 29 in the case of detection of saturation SM of the loop (via the disconnection signal Cmd) to a predetermined zero value 32 from a zero voltage value 27 forced at the input of the low-pass filter 29 by means of the switch 25.

According to the state of saturation of the loop 10, this switch 25 makes it possible to connect the input $e_{LPF}$ of the low-pass filter 29 to the error signal e of the regulating loop 10 in the case of non-saturation nSM, or to select the desaturation of the low-pass filter 29 in the case of saturation SM detected of the regulating loop 10.

The advantage of this electronic device 33 is to permit rapid passage to regulation of type P in the case of detection of saturation SM, and rapid return to an expected regulated value in the case when the saturation is no longer detected nSM.

All of the elements of the second preferred embodiment of a PI regulating loop 10 according to the invention are contained in FIG. 5, together with other details:

input signal 12 representing the battery voltage 7 or the voltage of the terminal "B+" of the alternator 1;

analogue filtering 34 (anti-aliasing, anti-ripple voltage filter), associated with the analogue-digital converter 35 and voltage divider 34, in order to adapt the level of voltage for the analogue-digital converter 35; analogue-digital converter 35;

an error calculation system 13 between the measurement signal $U_m$ and the set point $U_0$;

digital set point 36 generating the set point $U_0$ required; anti-aliasing filter 37 associated with the decimation produced by the generation of the PWM control signal;

a first amplifier 14 of the proportional part of the regulating loop 10 (proportional gain $K_p$ adjusted in order to guarantee the stability of the regulator device 2 connected to the alternator 1 connected to the battery 7);

an adder block 16 between the proportional part 14 and the integral part 20, 29;

a saturation block 17 which makes it possible to adapt the format of the data of the regulating loop 10 to that of the generation system 38 for generation of the PMW control signal, between a minimum value $Y_{min}$ and a maximum value $Y_{max}$;

a generation system 38 for generation of the PMW control signal (controlling the control device 11 of the excitation current $I_e$ of the alternator 1), produced by comparison between a triangular reference signal (also known as the "sawtooth" signal) and the regulating signal $Y_{sat}$ obtained from the saturation block 17; a switch 25 which connects or disconnects the integral part 20, 29 according to the disconnection signal Cmd generated by the saturation block 17 and according to an associated signal of the regulator function, in particular a progressive load response control (LRC) signal, combined by a logic gate 39;

a second amplifier 20 (with an integrator gain $K_i$ designed to guarantee the stability of the regulator device 2 connected to the alternator 1 connected to the battery 7); low-pass filter 29 with a very low cut-off frequency $f_c$ which provides the integral part 20, 29 of the regulating loop 10;

disconnection signal Cmd of the switch 25 representing the saturation of the regulating loop 10 generated by the saturation detector 24;

PWM control signal controlling the control device 11 which control the excitation current of the alternator 1;

associated LRC signal which permits inhibition of the integral part 20, 29 of the regulating loop 10 by an associated regulator function, such as a progressive Load Response Control signal.

Figure 7:
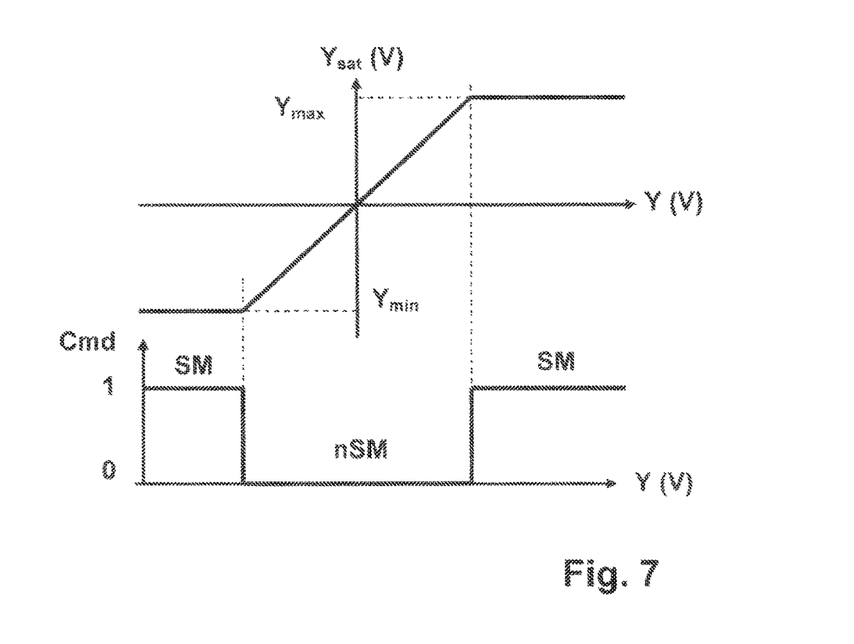
FIG. 7 shows the operating principle of a conditional detection anti-saturation system implemented in the regulating loop according to the invention.

Implementation of the detection of the saturation in the saturation detector 24 is carried out by a numerical algorithm illustrated in FIG. 7.

The following signals are used for the detection of saturation:

Y: intermediate regulating signal at the input of the saturator block 17;
$Y_{sat}$: regulating signal at the output of the saturator block 17;
Cmd: disconnection control signal.

The algorithm for detection of the saturation is as follows:

IF($Y=Y_{sat}$) THEN $Cmd=0$

OTHERWISE $Cmd=1$

It will be appreciated that the above description would apply in similar terms to models of excitation rotary electrical machines other than the three-phase alternator represented in FIG. 1.

The numerical values indicated correspond to experimental developments and computer simulations carried out by the applicant company, and are provided purely by way of example.

The invention thus incorporates all the possible variant embodiments which would remain within the context defined by the following claims.

The invention claimed is:

1. A proportional integral regulating loop (10) for a digital regulator device (2) for a motor vehicle excitation rotary electrical machine (1) configured to function as a generator which provides an output voltage (Ub+) adjusted by an excitation current (Ie), said digital regulator device (2) comprising a control device (11) for controlling said excitation current (Ie) and said regulating loop (10), said regulating loop (10) comprising:
   at an input, a measuring device (35) for measurement by sampling of said output voltage (Ub+) generating a measurement signal (Um);
   an error calculation system (13) generating an error signal (e) equal to a difference between said measurement signal (Um) and a set point (U0);
   a processing system (14, 15, 16, 17, 18, 20) for processing of said error signal (e) generating a regulating signal (Ysat), said processing system comprising in parallel a first amplifier (14), an integrator (15) and an anti-saturation system (23); and
   at an output, a generation system (38) for generation of a control signal (PWM) controlling said control device (11) according to said regulating signal (Ysat),
   said anti-saturation system (23) comprising a saturation detector (24) generating a disconnection signal (Cmd) controlling a switch (25) which disconnects said integrator (15, 29) of said error calculation system (13) in the case of detection of a state of saturation (SM) of said regulating signal (Ysat).

2. The proportional integral regulating loop (10) according to claim 1, wherein said integrator (15, 29) is a pure digital integrator (15).

3. The proportional integral regulating loop (10) according to claim 2, wherein said integrator (15) has a transfer function with the form:

$$FT0(z) = \frac{a}{1-Z^{-1}}.$$

4. The proportional integral regulating loop (10) according to claim 3, further comprising a second amplifier (20) in series with said integrator (15, 29).

5. The proportional integral regulating loop (10) according to claim 3, wherein said switch (25) is additionally controlled by a progressive load response control signal (LRC).

6. The proportional integral regulating loop (10) according to claim 2, further comprising a second amplifier (20) in series with said integrator (15, 29).

7. The proportional integral regulating loop (10) according to claim 2, wherein said switch (25) is additionally controlled by a progressive load response control signal (LRC).

8. The proportional integral regulating loop (10) according to claim 1, wherein said integrator (15, 29) is a low-pass digital filter (29).

9. The proportional integral regulating loop (10) according to claim 8, wherein said low-pass digital filter (29) has a transfer function with the form:

$$FT1(z) = \frac{b}{1-(1-b)\cdot Z^{-1}}.$$

10. The proportional integral regulating loop (10) according to claim 9, wherein a cut-off frequency (fc) of said low-pass digital filter (29) is contained in a frequency band ranging from 10 mHz to 1 Hz.

11. The proportional integral regulating loop (10) according to claim 10, further comprising a second amplifier (20) in series with said integrator (15, 29).

12. The proportional integral regulating loop (10) according to claim 10, wherein said switch (25) is additionally controlled by a progressive load response control signal (LRC).

13. The proportional integral regulating loop (10) according to claim 9, further comprising a second amplifier (20) in series with said integrator (15, 29).

14. The proportional integral regulating loop (10) according to claim 9, wherein said switch (25) is additionally controlled by a progressive load response control signal (LRC).

15. The proportional integral regulating loop (10) according to claim 8, further comprising a second amplifier (20) in series with said integrator (15, 29).

16. The proportional integral regulating loop (10) according to claim 8, wherein said switch (25) is additionally controlled by a progressive load response control signal (LRC).

17. The proportional integral regulating loop (10) according to claim 1, further comprising a second amplifier (20) in series with said integrator (15, 29).

18. The proportional integral regulating loop (10) according to claim 17, wherein an integrator gain (Ki) of said second amplifier (20) has a predetermined value such as to reduce a static error.

19. The proportional integral regulating loop (10) according to claim 18, wherein said switch (25) is additionally controlled by a progressive load response control signal (LRC).

20. The proportional integral regulating loop (10) according to claim 17, wherein said switch (25) is additionally controlled by a progressive load response control signal (LRC).

21. The proportional integral regulating loop (10) according to claim 1, wherein said switch (25) is additionally controlled by a progressive load response control signal (LRC).

* * * * *